US010929469B2

United States Patent
Kirk et al.

(10) Patent No.: US 10,929,469 B2
(45) Date of Patent: Feb. 23, 2021

(54) CONTENT SUBJECT SUGGESTIONS

(71) Applicant: Oath Inc., New York, NY (US)

(72) Inventors: Robert Jacob Kirk, Milpitas, CA (US); Ashley Rose Schneider, Mountain View, CA (US); Yating Sheng, Shanghai (CN)

(73) Assignee: Verizon Media Inc., New York, NY (US)

( * ) Notice: Subject to any disclaimer, the term of this patent is extended or adjusted under 35 U.S.C. 154(b) by 91 days.

(21) Appl. No.: 16/421,983

(22) Filed: May 24, 2019

(65) Prior Publication Data

US 2019/0278810 A1 Sep. 12, 2019

Related U.S. Application Data

(63) Continuation of application No. 15/095,364, filed on Apr. 11, 2016, now Pat. No. 10,303,720.

(51) Int. Cl.
*G06F 16/9032* (2019.01)
*H04L 12/58* (2006.01)
*G06Q 10/10* (2012.01)

(52) U.S. Cl.
CPC .. *G06F 16/90332* (2019.01); *G06F 16/90324* (2019.01); *G06Q 10/107* (2013.01); *H04L 51/02* (2013.01); *H04L 51/08* (2013.01)

(58) Field of Classification Search
CPC ......... G06F 16/90332; G06F 16/90324; H04L 51/02; H04L 51/08
USPC ....................................................... 707/722
See application file for complete search history.

(56) References Cited

U.S. PATENT DOCUMENTS

| | | | | |
|---|---|---|---|---|
| 7,725,475 B1* | 5/2010 | Alspector | ............. | G06F 16/353 707/758 |
| 9,449,080 B1* | 9/2016 | Zhang | ................ | G06F 16/3331 |
| 2009/0006285 A1* | 1/2009 | Meek | ..................... | G06Q 10/10 706/12 |
| 2010/0114561 A1* | 5/2010 | Yasin | ..................... | G06F 40/216 704/9 |
| 2015/0341300 A1* | 11/2015 | Swain | ................... | G06F 16/287 707/738 |
| 2015/0350144 A1* | 12/2015 | Zeng | ....................... | H04L 51/02 709/206 |
| 2016/0103915 A1* | 4/2016 | Yoo | ..................... | G06F 16/5846 715/206 |
| 2017/0251006 A1* | 8/2017 | LaRosa | ............... | H04L 63/1441 |

\* cited by examiner

*Primary Examiner* — Kimberly L Wilson
(74) *Attorney, Agent, or Firm* — Cooper Legal Group, LLC

(57) ABSTRACT

One or more computing devices, systems, and/or methods for auto-generating subject suggestions are provided. For example, a set of n-grams are generated from text within an email body of an email being composed by a user and/or from descriptive information of attachments to the email. Features of the set of n-grams are identified, such as a date feature, a proper noun feature, an activity feature, a number of words feature, etc. Classifiers are used to assign probabilities to the n-grams based upon the features. A probability may specify a strength of an n-gram in relation to a user preference of the user for an email subject derived from the n-gram. In this way, an email subject suggestion is generated based upon a target n-gram with a probability exceeding a threshold. The email subject suggestion is provided to the user, such as during email composition or during sending of the email.

20 Claims, 9 Drawing Sheets

CONTENT SUBJECT SUGGESTIONS

CROSS REFERENCE TO RELATED APPLICATION

This application claims priority to and is a continuation of U.S. application Ser. No. 15/095,364, filed on Apr. 11, 2016, entitled "CONTENT SUBJECT SUGGESTIONS", which is incorporated herein.

BACKGROUND

Many users send and/or share content with one another through various applications, services, and/or websites. In an example, a user may send an email message to a second user about making plans to see a movie. In another example, the user may create a blog about videogames. In this way, the user may send and/or share content, such as emails, instant messages, blogs, social network posts, images, documents, videos, etc., with other users. Such content may be labeled with a content subject. In an example, email messages may be labeled with an email subject. In another example, a blog may be labeled with a blog title. In another example, a photo, shared through a photo sharing service as a photo post, may be labeled with a photo post title. Unfortunately, users may have trouble determining a subject for content, and thus may forego sharing content. For example, a user may send less emails when having trouble developing email subjects.

SUMMARY

In accordance with the present disclosure, one or more computing devices and/or methods for auto-generating content subject suggestions are provided. In an example, a set of classifiers are trained using a training set of email body text and email subjects to create a set of trained classifiers (e.g., a classifier is trained based upon what email subjects are created by users for emails with certain email body text and features thereof). The set of trained classifiers are trained to weigh probabilities that if certain features exist within email body text, then how much do such features affect an email subject (e.g., how much a date feature, a number of words feature, a proper noun feature, a specific action feature, a complete phrase feature, and/or other features within the email body text affect the email subject). In this way, a classifier may specify how important a particular feature is to users and/or to a particular user (e.g., when the user includes a date within an email body text, then the user usually adds the date into the email subject; the user usually creates long email subjects and thus a word count feature of 5 words or more may be more important than smaller word count features; users generally exclude proper noun names of people, included within email body text, from email subjects; etc.). In an example, the set of classifiers are trained based upon historic emails sent by a particular user, which may improve precision of the set of trained classifiers for that user.

The set of trained classifiers may be used to generate an email subject suggestion for a user. For example, text may be extracted from an email body of an email, displayed through an email creation interface for email composition by a user, to generate a set of n-grams (e.g., unigrams with single words from the text, bigrams with two words from the text, trigrams with three words from the text, etc.). In an example, an n-gram comprises a sequence of n items, such as n phonemes, n syllables (e.g., a trigram of syllables "chocolate"), n letters (e.g., a bigram of letters "hi"), n words (e.g., a trigram of words "how are you"), etc., which may be derived from text, speech, or other content. In an example, if the email has an attachment, then the attachment may be evaluated to identify one or more n-grams to add into the set of n-grams (e.g., image recognition may be performed upon an image attachment to identify n-grams describing a location of the image attachment, a person depicted within the image attachment, an activity being performed in the image attachment, etc.; a text document attachment may be parsed to identify the one or more n-grams; etc.).

Features of the n-grams within the set of n-grams may be identified. The features may correspond to a date feature (e.g., an n-gram representing a date or date range), a word count feature (e.g., a number of words within an n-gram), a proper noun feature (e.g., an n-gram of a business name), a specific action feature (e.g., an n-gram describing a person planning a movie date), a complete phrase feature, and/or other features. The set of trained classifiers may be utilized to assign probabilities to the n-grams of the set of n-grams based upon the features (e.g., a relatively higher probability may be assigned to an n-gram that is a complete phrase based upon a classifier indicating that users tend to use complete phrases within email subjects; a relatively lower probability may be assigned to an n-gram with 2 words based upon the classifier indicating that the user tends to use email subjects with 6 words or more; etc.). A target n-gram may be identified from the set of n-grams based upon the target n-gram having an assigned probability exceeding a threshold (e.g., an n-gram with a highest assigned probability). An email subject suggestion may be generated based upon the target n-gram (e.g., a target n-gram "why don't we plan a vacation to the lake house" may be used to generate an email subject suggestion "lake house vacation planning"). In this way, the email subject suggestion may be provided through the email creation interface (e.g., dynamically during email body composition, during sending of the email such as in response to when there is no email subject for the email, etc.).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
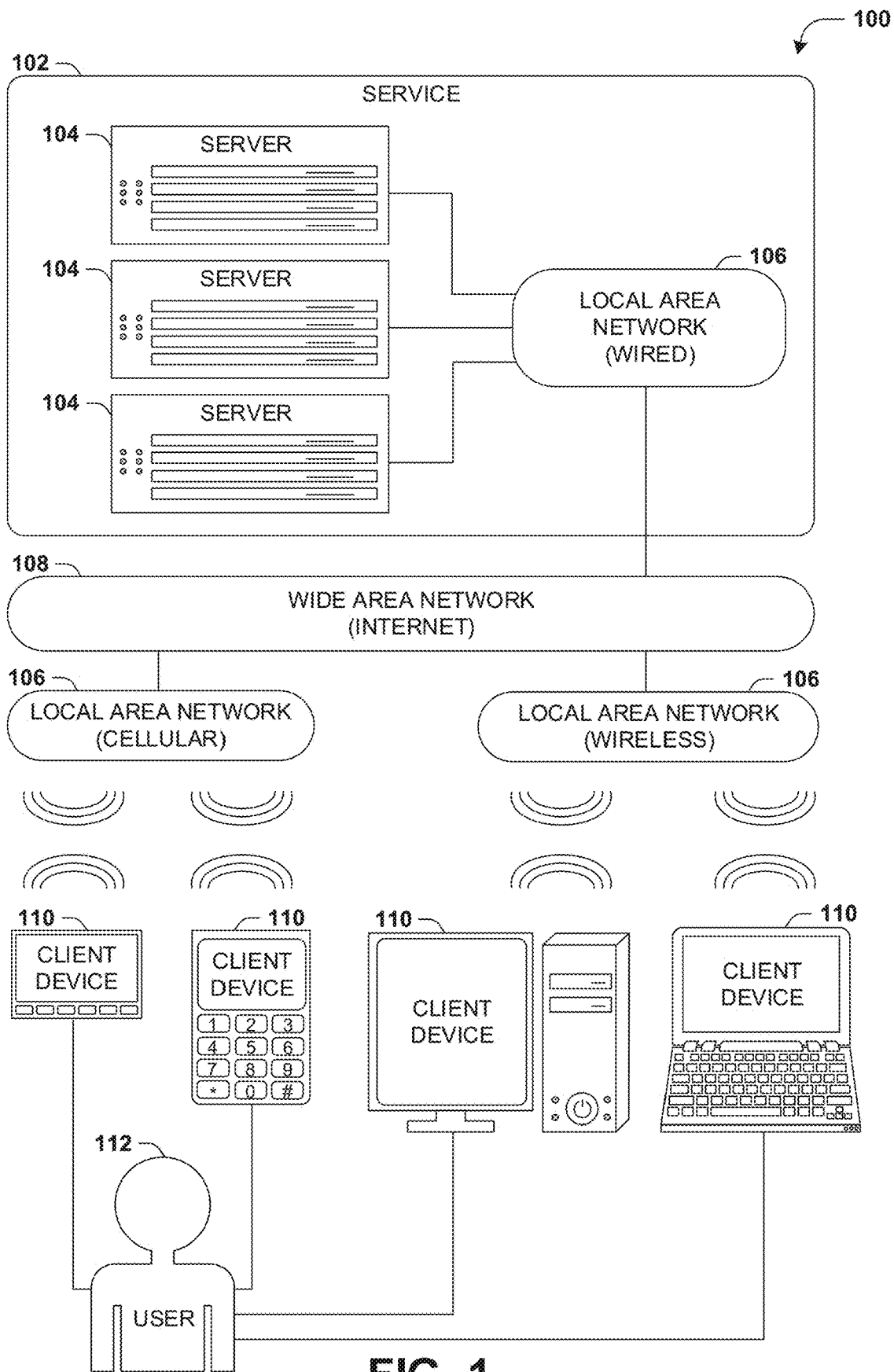
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
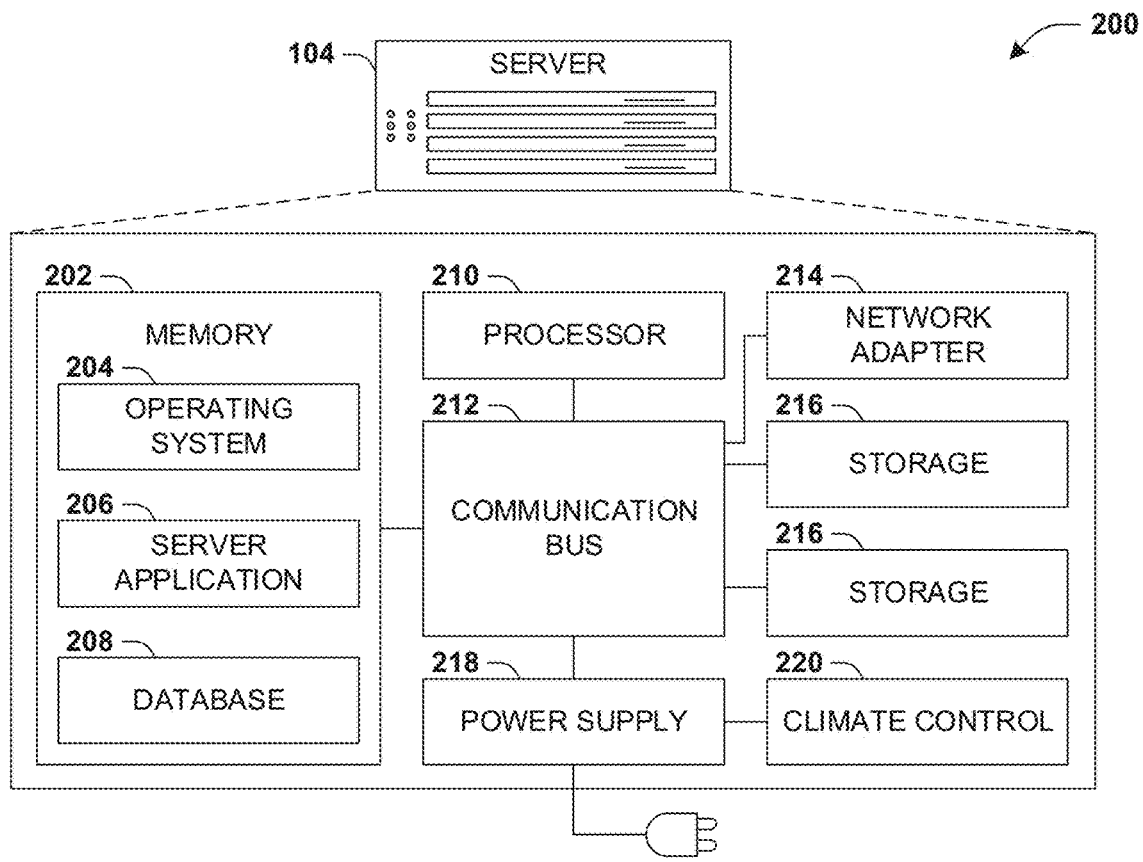
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
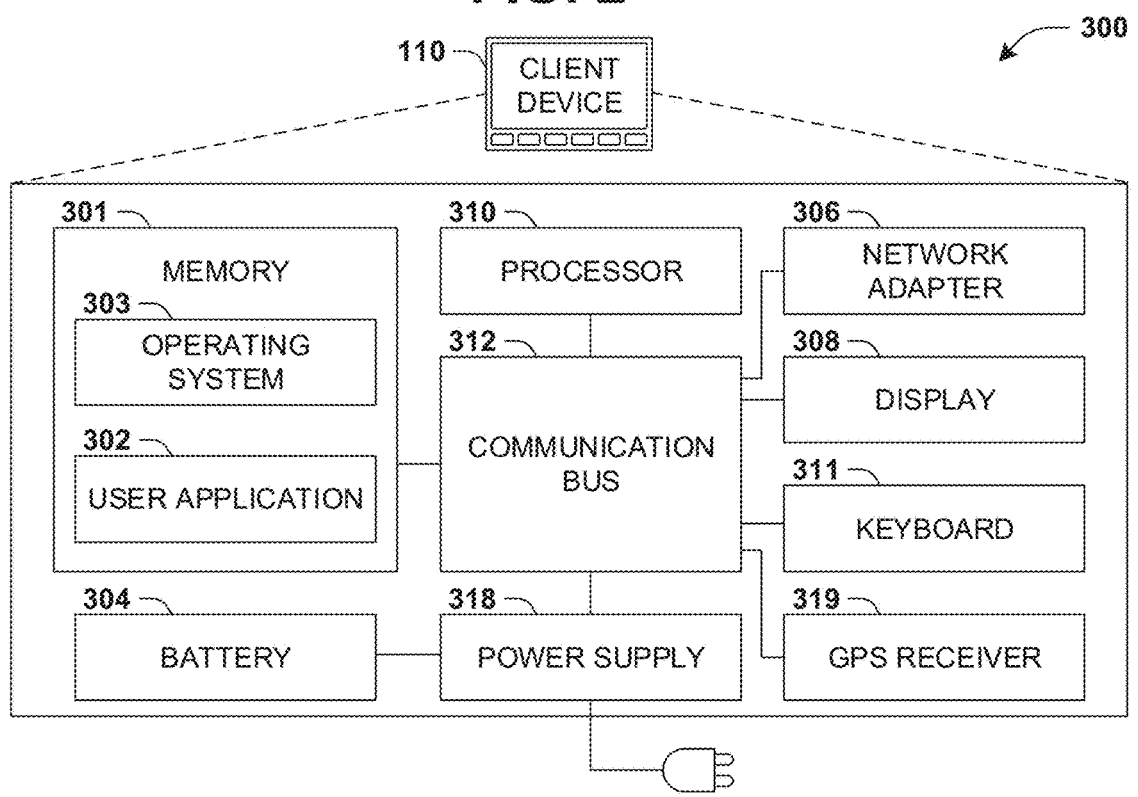
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for auto-generating content subject suggestions are provided. Users may share content that can be associated with content subjects, such as an email with an email subject. Unfortunately, users may spend substantial amounts of time determining an appropriate content subject, and may forgo sending or sharing content if the users cannot develop a satisfactory content subject. For example, when a user has a difficult time developing email subjects for emails, the user may send less emails. Accordingly, as provided herein, content sending or sharing amongst users may be promoted with increased accuracy by providing auto-generated content subject suggestions for content. For example, classifiers, trained based upon email body text and email subjects, may be used to evaluate an email body of an email and/or any attachments of the email for auto-generating email subject suggestions that may be tailored to particular email subject preferences of a user (e.g., short email subjects, long email subjects, using proper nouns within email subjects, using dates within email subjects, using complete phrases within email subjects, etc.). In this way, the likelihood and efficiency of content sharing by users, such as sending emails, is improved because users may not waste significant amounts of time developing content subjects and/or forgoing sharing content because the users could not develop satisfactory content subjects.

Figure 4:
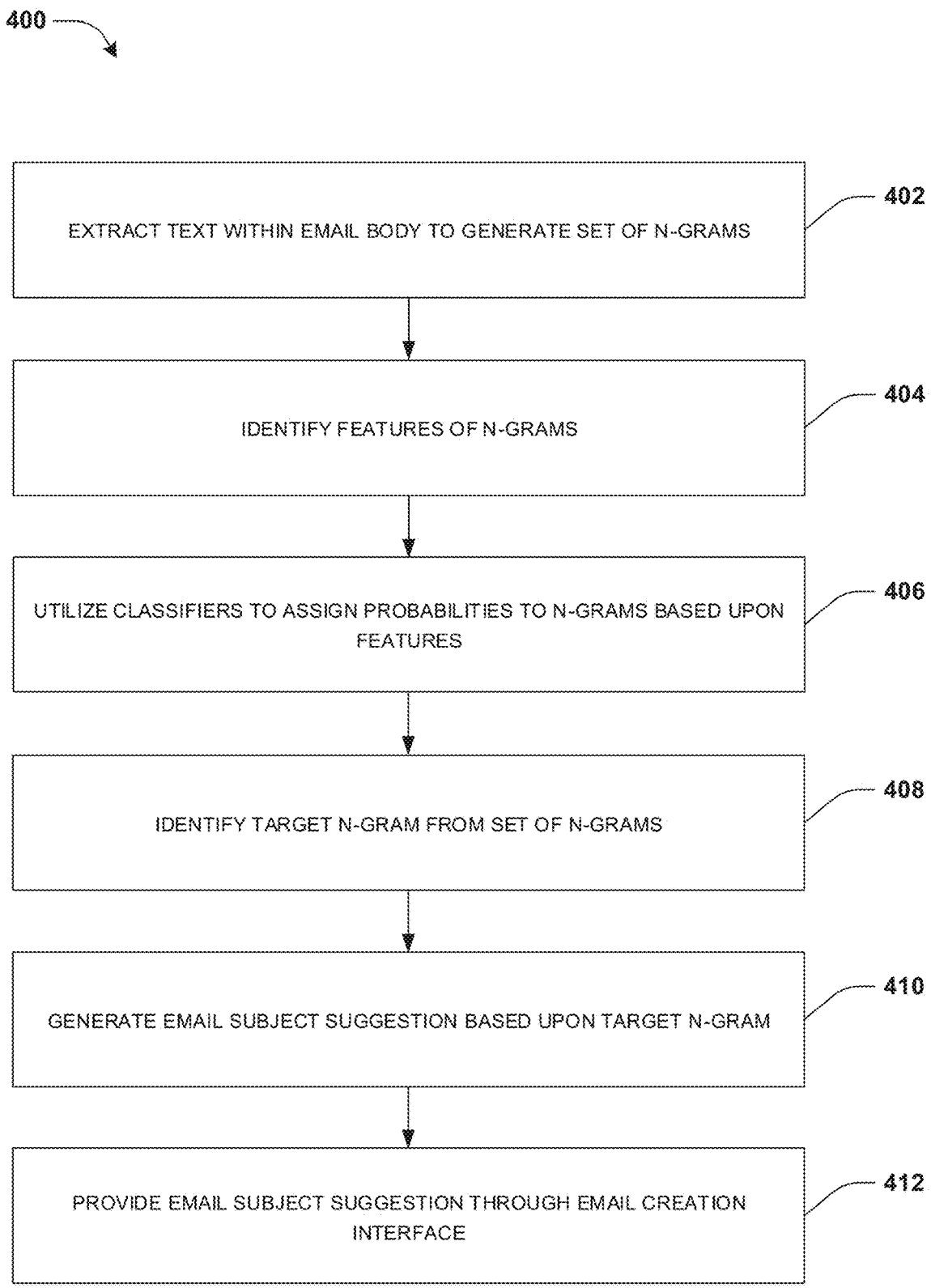
FIG. 4 is a flow chart illustrating an example method for auto-generating an email subject suggestion.

An embodiment of auto-generating email subject suggestions is illustrated by an example method 400 of FIG. 4. At 402, text may be extracted from an email body of an email, displayed through an email creation interface for email composition, to generate a set of n-grams. For example, the text "Hi Jim, want to plan on going to the new Action Movie this Saturday 4/5/16? We could drive to the Akron Movie Theatre together" may be parsed to identify unigrams of 1 word (e.g., "Jim", "Action", etc.), bigrams of 2 words (e.g., "the new", "new Action", "Action Movie", "to plan", etc.), trigrams of 3 words (e.g., "want to plan", "this Saturday 4/5/16", etc.), etc.

In an example, an attachment to the email may be evaluated to identify one or more n-grams to add into the set of n-grams. In an example, text may be extracted from the attachment as the one or more n-grams (e.g., the attachment may comprise a text document). In another example, text may be extracted from metadata of the attachment as the one or more n-grams (e.g., a location at which an attachment of a photo was taken, who took the photo, a date of the photo, etc.). In another example, an image recognition technique may be used to evaluate an attachment of an image to identify the one or more n-grams (e.g., n-grams describing a person or location depicted within the image, an activity being performed within the image, a business depicted within the image, etc.). In another example, a voice recognition technique may be utilized to evaluate an attachment of audio to identify the one or more n-grams (e.g., an n-gram transcript of a business name spoken within the audio attachment). In this way, a variety of attachments, such as documents, videos, images, websites, etc. may be evaluate to identify n-grams to add to the set of n-grams.

At 404, features of n-grams within the set of n-grams may be identified. For example, a feature may correspond to a number of words feature (e.g., a number of words within an n-gram), a proper noun feature (e.g., a name of a person or business within in n-gram), a date feature (e.g., a particular date, date range, or holiday within an n-gram), a specific action feature (e.g., an n-gram "want to go eat pizza for lunch at Pizza Plus" corresponding to a get pizza at Pizza Plus action), an event feature (e.g., an n-gram "let's go to the music festival" corresponding to a music festival event), a complete phrase feature (e.g., an n-gram "I want to buy this new car" may be a complete phrase compared to an n-gram "this new car" or an n-gram "I want to buy"), a location feature (e.g., an n-gram "Manhattan", an identified person feature (e.g., an n-gram "George Washington"), etc.

At 406, classifiers, trained using a training set of email body text and email subjects (e.g., historic emails sent by the user and/or other users, where feature within email bodies and/or attachments are correlated to actual email subjects used for such emails), are used to assign probabilities to the n-grams within the set of n-grams based upon the features. In an example, a probability may specify a strength of an n-gram in relation to a user preference of the user for an email subject derived from the n-gram. For example, a higher probability assigned to an n-gram may be a stronger indicator that the user will prefer to use an email subject derived from the n-gram, which may be specified by the classifier based upon the n-gram having features that are preferred by the user for email subjects (e.g., an n-gram with a word length feature greater than 5 because the user generally creates email subjects with more than 5 words, an n-gram with a date feature because the user generally includes dates within email subjects when such dates are included within email bodies, an n-gram without a person's name because the user generally does not include people's names within email subjects when such names are included within email bodies, etc.).

In an example, if the email body comprises a date and the classifiers were trained by emails of the user where the user would usually include dates within email subjects when the dates were included within email bodies, then n-grams with date features may be assigned higher probabilities than n-grams without date features. In another example, if the classifiers were trained by emails of the user where the user would usually have email subjects with 5 or more words, then n-grams with 5 or more words may be assigned higher probabilities than n-grams with less words. In an example, if the email body comprises an event and the classifiers were trained by emails of the user where the user would usually include events within email subjects when the events were included within the email body, then n-grams with event features may be assigned higher probabilities than n-grams without event features. In another example, if the classifiers were trained by emails of the user where the user would usually have email subjects with complete phrases, then n-grams with complete phrase features may be assigned higher probabilities than n-grams without complete phrase features.

At 408, a target n-gram may be identified from the set of n-grams based upon the target n-gram having an assigned probability exceeding a threshold (e.g., an n-gram with the highest probability). At 410, an email subject suggestion may be created based upon the target n-gram. In an example, an n-gram "want to grab coffee tomorrow" may be used to create an email subject suggestion "coffee tomorrow". In an example, one or more words may be added to (e.g., or removed from) the target n-gram to create a complete phrase as the email subject suggestion (e.g., an n-gram "Action Movie at New Theatre" may be expanded to an expanded email subject suggestion "Want to see the Action Movie at the New Theatre"). In an example, a set of target n-grams having assigned probabilities exceeding the threshold (e.g., n-grams with the 3 highest probabilities, such as n-gram "are you free 4/5/16", n-gram "want to see Action Movie", and n-gram "the New Theatre just opened") may be identified. A common theme amongst the target n-grams may be identified (e.g., a common theme to see the Action Movie at the New Theatre on Apr. 5, 2016). Accordingly, the email subject suggestion may be generated based upon the common theme (e.g., an email subject suggestion "Want to see the Action Movie at the New Theatre on Apr. 5, 2016"). In an example, an abstract phrase may be generated based upon the target n-gram as the email subject suggestion (e.g., an n-gram "eat pizza" may be used to create an abstract phase "meet for pizza" as the email subject suggestion).

At 412, the email subject suggestion may be provided through the email creation interface. In an example, the set of target n-grams may be used to generate a set of e-mail subject suggestions that may be provided through the email creation interface (e.g., provided within a drop down box, list or any other user interface element). In an example of providing the email subject suggestion, responsive to the user initiating an email send command for the email while the email does not comprise a user specified email subject, the email subject suggestion may be provided to the user for selective use as the email subject before executing the email send command, thus giving the user an opportunity to select the email subject suggestion to use as the email subject for the email.

In another example of providing the email subject suggestion, email subject suggestions may be dynamically provided while the user is composing the email. For example, the email subject suggestion may be displayed within an email subject input interface during email body composition of the email by the user through the email creation interface. For example, the email subject suggestion may be displayed at a first point in time. Responsive to the user modifying the email with a text modification and/or an attachment modification at a second point in time (e.g., adding, removing, or modifying text and/or attachments of the email), the email subject suggestion may be updated based upon one or more new n-grams derived from a current state of the email at the second point in time (e.g., a current state of the email body text and/or attachments after the text modification and/or the attachment modification) to create a new email subject suggestion. The new email subject suggestion may be displayed within the email subject input interface. Because the email subject input interface is being dynamically populated with email subject suggestions during email composition, the email subject input interface may be disable for user input with an option to enable the email subject input interface for manually specifying an email subject or for modifying a current email subject suggestion displayed through the email subject input interface.

In an example where the set of email subject suggestions were provided to the user, responsive to the user selecting a first email subject suggestion (e.g., "Let's meet on 4/5/16") and not a second email subject suggestion (e.g., "Let's meet in the board room to discuss an action plan", a first feature (e.g., a date feature) used to assign a first probability to a first n-gram (e.g., a n-gram "4/5/16") used to create the first email subject suggestion may be adjusted (e.g., a strength of the date feature may be increased because the user may prefer email subjects with dates). A second feature (e.g., a word count feature of 10 or more words) used to assign a second probability to a second n-gram "I want to meet in the board room to discuss an action plan" may be adjusted (e.g., a strength of the word count feature may be decreased because the user does not prefer lengthy email subjects). In this way, the classifiers may be updated and/or re-trained based upon user interaction with email subject suggestions.

Figure 5:
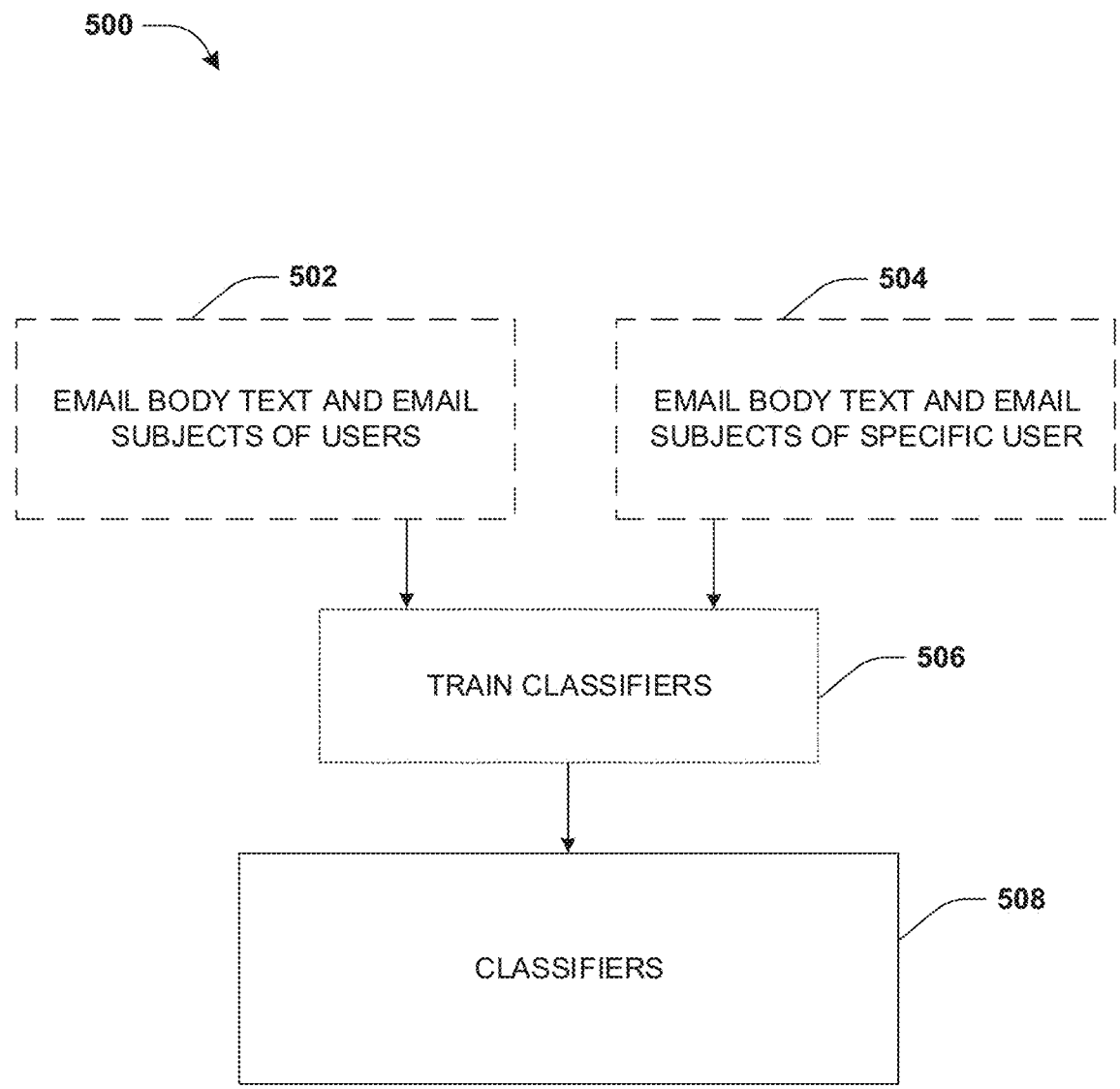
FIG. 5 is a component block diagram illustrating an example system for training classifiers used for auto-generating an email subject suggestion.

FIG. 5 illustrates an example of a system 500 for training 506 a set of classifiers 508. For example, emails 502, comprising email body text and email subjects, of various users may be used to globally train the classifiers 508 to weight probabilities of features within email body text as being important or not important to users when creating the email subjects. In an example, users may have a tendency to use complete phrases within the email body text when creating email subjects. In another example, users may have a tendency to not use proper names of people within the email body text when creating email subjects. In this way, the classifiers 508 may be globally trained to weight probabilities of features, such as a complete phrase feature, a proper name feature, etc.

Emails 504, comprising email body text and email subjects, of a particular user may be used to locally train the classifiers 508 to weight probabilities of features within email body text as being important or not important to the user when creating the email subjects. In an example, the emails 504 may indicate that the user creates email subjects using phrases within email body text having 4 of less words. In another example, the emails may indicate that the user includes dates from email body text when creating email subjects. In this way, the classifiers 508 may be locally trained to weight probabilities of features, such as a word count feature, a date feature, etc.

Figure 6A:
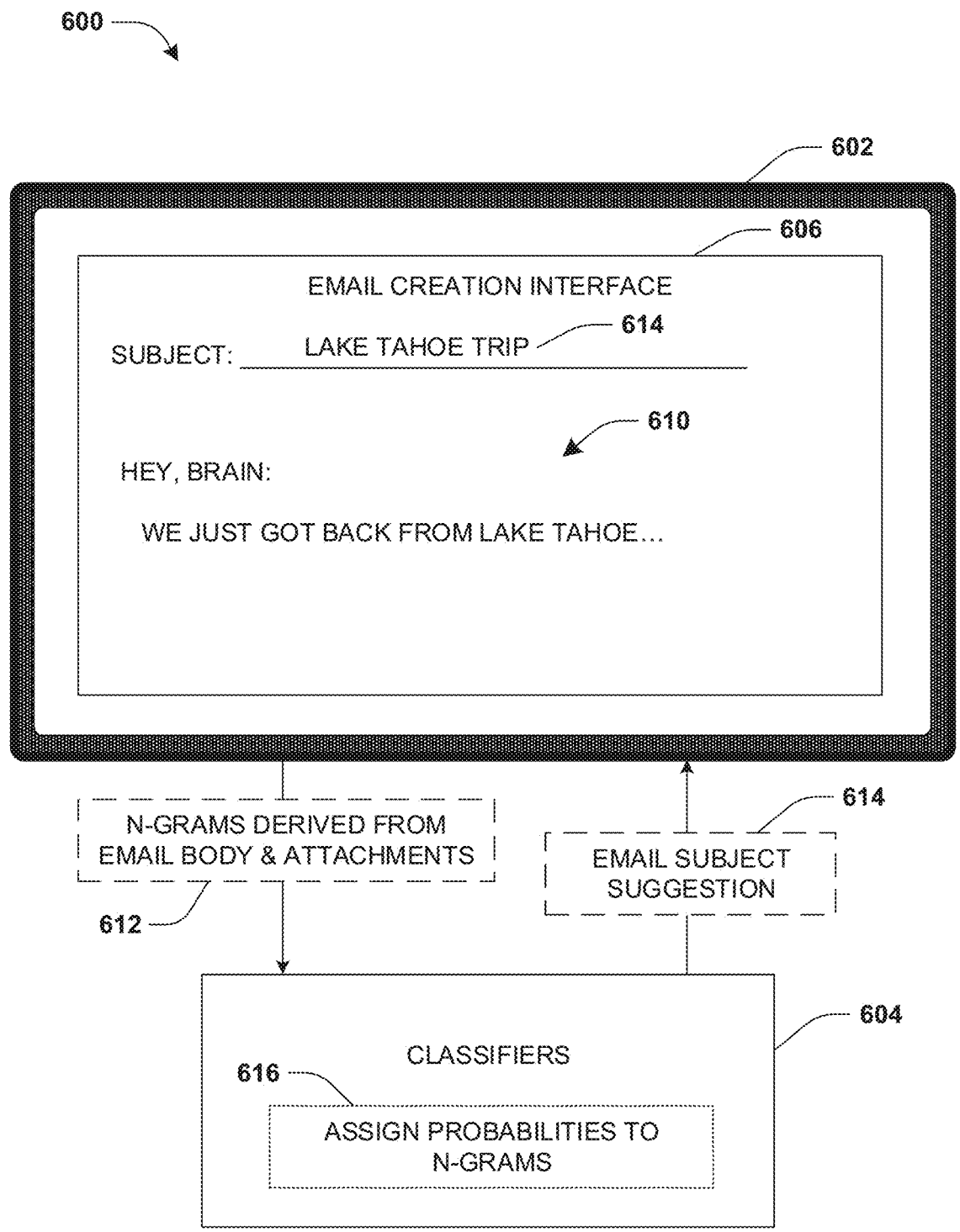
FIG. 6A is a component block diagram illustrating an example system for auto-generating an email subject suggestion, where the email subject suggestion is provided during email composition.
Figure 6B:
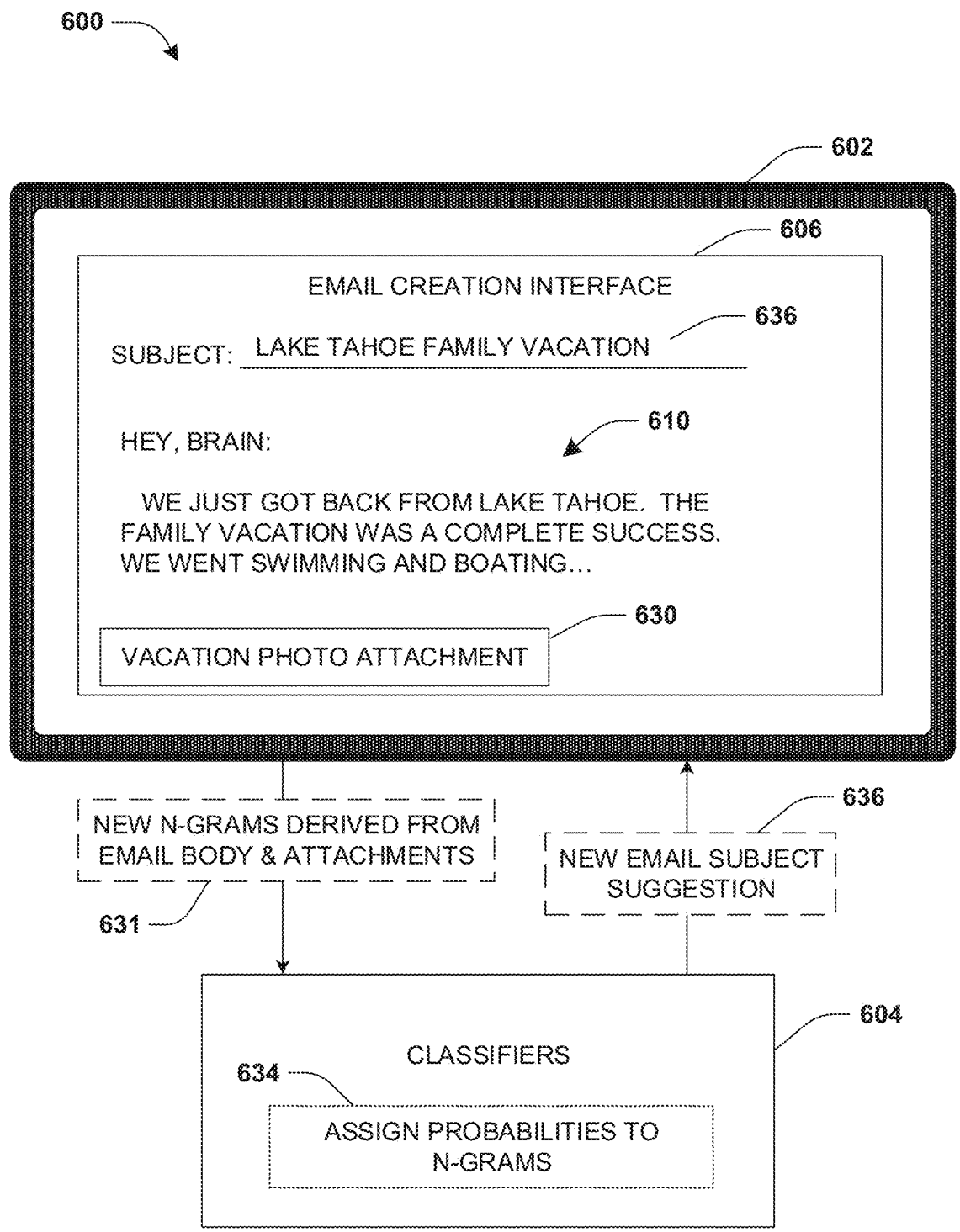
FIG. 6B is a component block diagram illustrating an example system for auto-generating an email subject suggestion, where a new email subject suggestion is provided during email composition.

FIGS. 6A and 6B illustrate examples of a system for auto-generating email subject suggestions. FIG. 6A illustrates a user using a client device 602 to access an email creation interface 606 for email composition of an email 610. The user may type text "Hey, Brian: We just got back from Lake Tahoe" into an email body of the email 610. N-grams 612 may be extracted from the text of the email body and/or from any attachments to the email 610. For example, the n-grams 612 may comprise unigrams such as "we", "just", "got", "back", etc. The n-grams may comprise bigrams "hey Brian", "we just", "got back", "Lake Tahoe", etc. The n-grams may comprise trigrams or any other combination of words from the email body of the email 610. Features may be identified for the n-grams 612, such as a word count feature, a proper noun feature, a date feature, a specific action feature, an event feature, a complete phrase feature, a location feature, etc. Classifiers 604 may be used to assign 616 probabilities to the n-grams 612 based upon the features. A target n-gram "Lake Tahoe" having a highest probability (e.g., based upon a proper noun feature) may be used to create an email subject suggestion 614 "Lake Tahoe Trip" that may be provided to the user during email composition through the email creation interface 606.

FIG. 6B illustrates the user continuing to compose the email 610 after the email subject suggestion 614 "Lake Tahoe Trip" was provided to the user. For example, the user may add additional text "The family vacation was a complete success. We went swimming and boating" to the email body and may attach a vacation photo attachment 630 to the email 610. A current state of the email body (e.g., the text and the additional text) and the vacation photo attachment 630 may be evaluated to identify a new set of n-grams 631. Features of the new set of n-grams 631 may be identified (e.g., an image recognition technique may be used to identify a lake location feature and a family gathering event feature of the vacation photo attachment 630), and the classifiers 604 may be used to assign 634 probabilities to the new set of n-grams 631 based upon the features. The target n-gram "Lake Tahoe" and a second target n-gram "family vacation" having the highest probabilities may be used to create a new email subject suggestion 636 "Lake Tahoe family vacation" that may be provided to the user during email composition through the email creation interface 606. In this way, email subject suggestions may be dynamically provided to the user during email composition.

Figure 7:
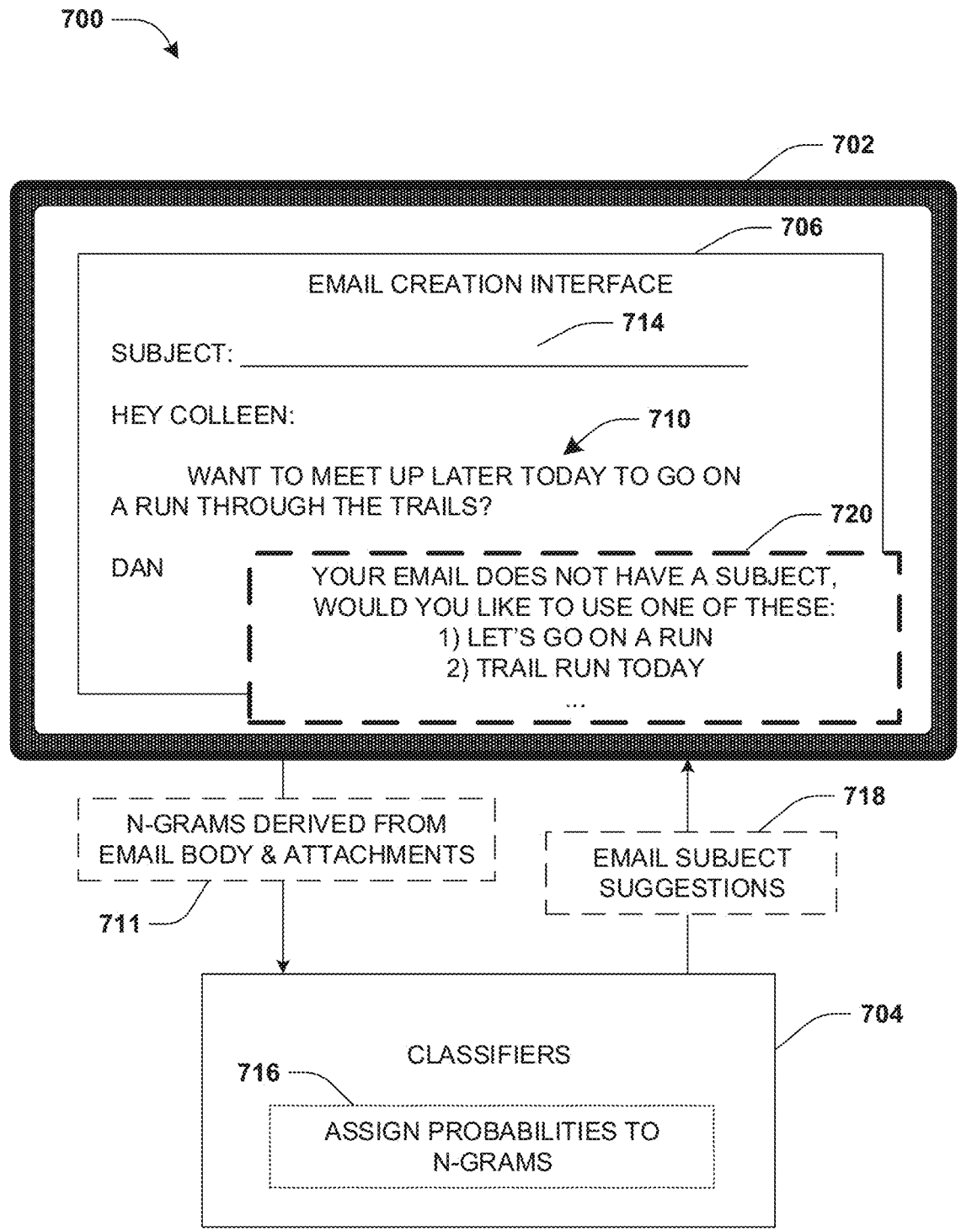
FIG. 7 is a component block diagram illustrating an example system for auto-generating an email subject suggestion, where the email subject suggestion is provided during email sending.

FIG. 7 illustrates an example of a system 700 for auto-generating email subject suggestions. A user may use a client device 702 to access an email creation interface 706 for email composition of an email 710. The user may type text "Hey Colleen: Want to meet up later today to go on a run through the trails? Dan" into an email body of the email 710. N-grams 711 may be extracted from the text of the email body and/or from any attachments the email 710 (e.g., n-grams "want", "today", "run", "go on a run", "through the trails", "meet up later today", etc.). Features may be identified for the n-grams 711, such as a word count feature, a proper noun feature, a date feature, a specific action feature, an event feature, a complete phrase feature, a location feature, an identified person feature, etc. Classifiers 704 may be used to assign 716 probabilities to the n-grams 711 based upon the features. A set of target n-grams having a highest probability (e.g., n-gram "let's go on a run" and n-gram "run through the trails") may be used to create email subject suggestions 718, such as "let's go on a run" and "trail run today" that may be provided to the user. For example, the user may attempt to send the email 710 while the email 710 does not have an email subject 714. Accordingly, the email subject suggestions 718 may be presented to the user, such as through a user interface 720 before the email is sent.

Figure 8:
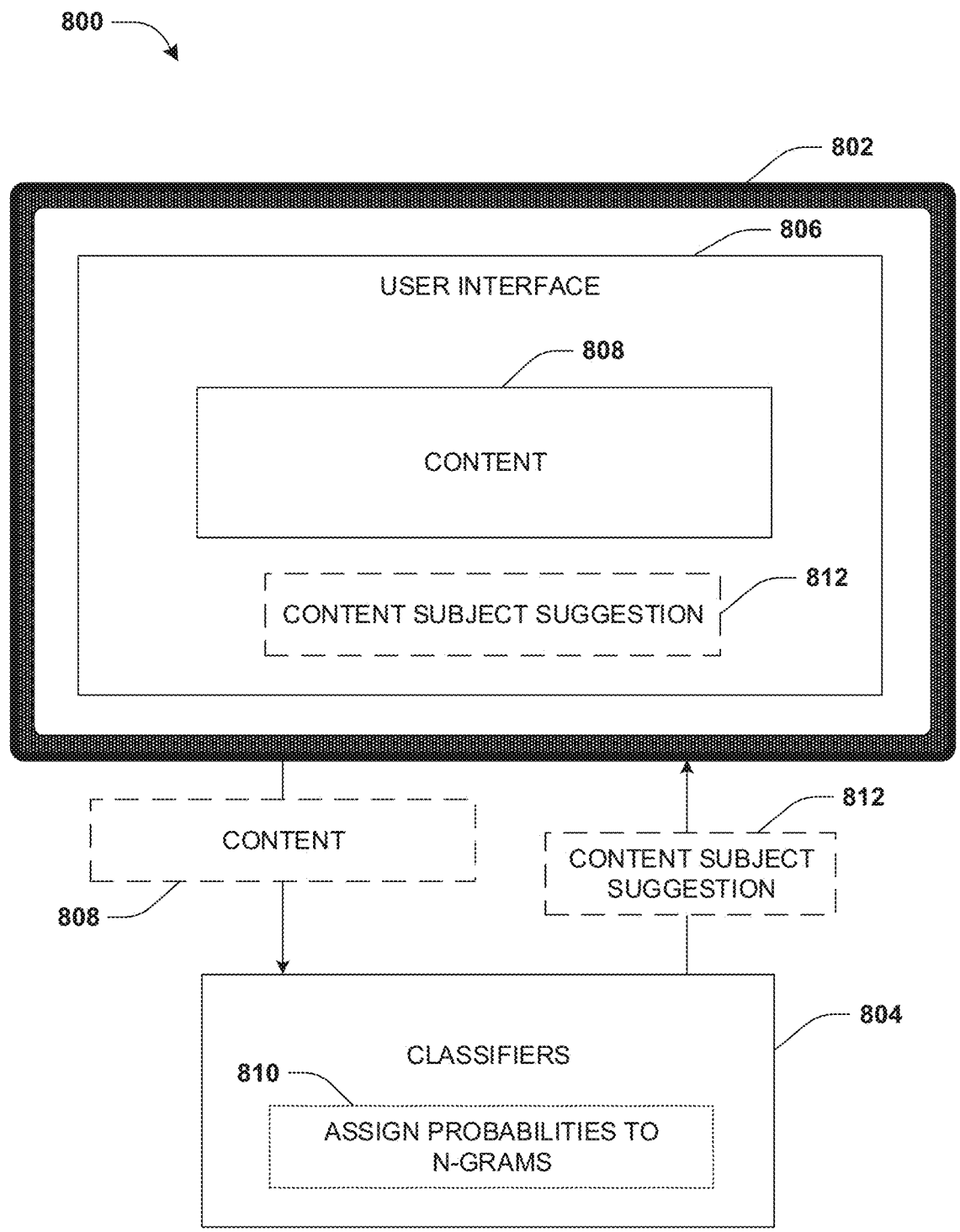
FIG. 8 is a component block diagram illustrating an example system for auto-generating a content subject suggestion.

FIG. 8 illustrates an example system 800 for auto-generating content subject suggestions. A user may use a client device 802 to access a user interface 806 through which the user may create, send, and/or share content 808 (e.g., a blogging website for creating blogs, an image sharing website for sharing images, a social network application for posting social network posts, a video sharing service for sharing videos, a movie review website for submitting movie reviews, etc.). For example, the content 808 may comprise an image that the user wants to upload to the image sharing website to share through an image sharing post. Feature recognition functionality (e.g., image recognition functionality for the image) may be used to extract content features from the content 808 to generate a set of n-grams descriptive of the content 808 (e.g., n-grams comprising words describing a location of where the image was captured, a user that captured the image, a family depicted within the image, an activity being performed within the image, etc.). Features, of the n-grams within the set of n-grams, may be identified (e.g., a date feature, an identified person feature, a location feature, a proper noun feature, etc.).

Classifiers 804 may be used to assign 810 probabilities to the n-grams based upon the features. For example, a probability may specify a strength of an n-gram in relation to a user preference of the user for a content subject derived from the n-gram (e.g., the user may have a strong preference to label content with subjects using location names and activity names). In this way, a target n-gram may be identified from the set of n-grams based upon the target n-gram having an assigned probability exceeding a threshold (e.g., an n-gram "family hiking adventure" having a largest assigned probability). A content subject suggestion 812 for the content 808 may be generated based upon the target n-gram. For example, the content subject suggestion 812 may suggest that the user label the image sharing post of the image with a subject of "family hiking vacation" when sharing the image through the image sharing website. In this way, content subject suggestions may be auto-generated for various types of content, such as images, blogs, documents, social network posts, instant messages, social network conversations, social network events (e.g., an event name for a social network birthday party event that is derived from n-grams extracted from content of the social network birthday party event), etc.

Figure 9:
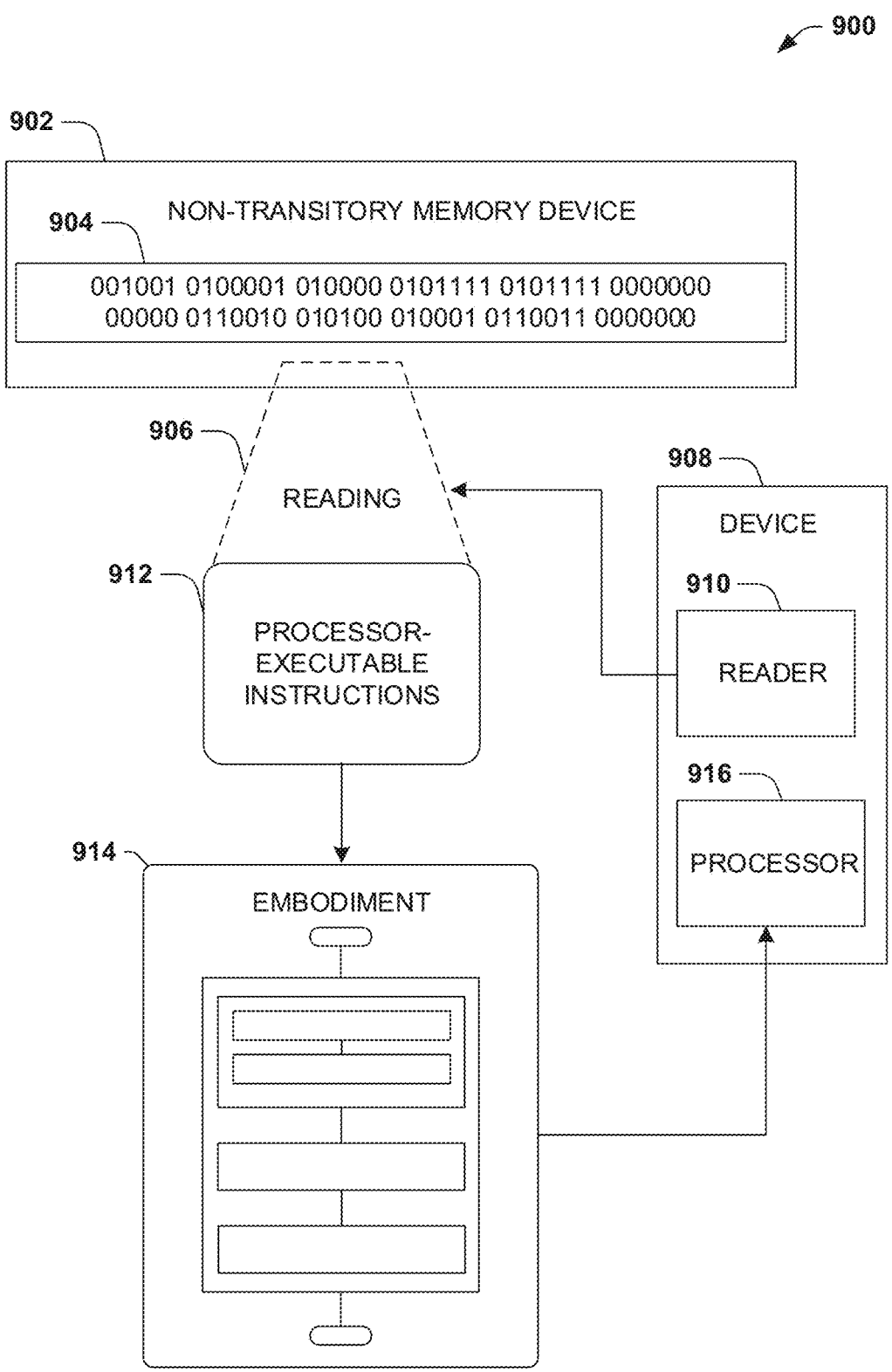
FIG. 9 is an illustration of a scenario featuring an example non-transitory memory device in accordance with one or more of the provisions set forth herein.

FIG. 9 is an illustration of a scenario 900 involving an example non-transitory memory device 902. The non-transitory memory device 902 may comprise instructions that when executed perform at least some of the provisions herein. The non-transitory memory device may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a compact disk (CD), a digital versatile disk (DVD), or floppy disk). The example non-transitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912 associated with an embodiment 914. In some embodiments, the processor-executable instructions, when executed on a processor 916 of the device 908, are configured to perform a method, such as at least some of the example method 400 of FIG. 4, for example. In some embodiments, the processor-executable instructions, when executed on the processor 916 of the device 908, are configured to implement a system, such as at least some of the example system 500 of FIG. 5, at least some of the example system 600 of FIGS. 6A-6B, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    extracting text within an email body of an email, displayed through an email creation interface to a user for email composition, to generate a set of n-grams;
    identifying features of n-grams within the set of n-grams;
    utilizing classifiers, trained using a training set of email body text and email subjects, to assign probabilities to the n-grams within the set of n-grams based upon the features, a probability specifying a strength of an n-gram in relation to a user preference of the user for an email subject derived from the n-gram;
    identifying a set of target n-grams from the set of n-grams based upon the set of target n-grams having assigned probabilities exceeding a threshold;
    identifying a single common theme amongst a plurality of target n-grams within the set of target n-grams, wherein the plurality of target n-grams comprises a first target n-gram associated with the single common theme and a second target n-gram associated with the single common theme, wherein the first target n-gram is different than the second target n-gram;
    responsive to identifying the single common theme, generating an email subject suggestion based upon the single common theme; and
    providing the email subject suggestion through the email creation interface.

2. The method of claim 1, wherein the generating an email subject suggestion comprises:
    adding one or more words to at least some of the plurality of target n-grams to create a complete phrase as the email subject suggestion.

3. The method of claim 1, wherein the email subject suggestion comprises a first portion of the first target n-gram and a second portion of the second target n-gram.

4. The method of claim 1, comprising:
    evaluating an attachment to the email to identify one or more n-grams to add into the set of n-grams.

5. The method of claim 4, wherein the evaluating comprises:
    extracting text from the attachment as the one or more n-grams.

6. The method of claim 4, wherein the evaluating comprises:
    extracting text from metadata of the attachment as the one or more n-grams.

7. The method of claim 4, wherein the attachment comprises an image, and wherein the evaluating comprises:
    utilizing an image recognition technique to evaluate the image to identify the one or more n-grams.

8. The method of claim 4, wherein the attachment comprises audio, and wherein the evaluating comprises:
    utilizing a voice recognition technique to evaluate the audio to identify the one or more n-grams.

9. The method of claim 1, wherein the providing the email subject suggestion comprises:
    displaying the email subject suggestion within an email subject input interface during email body composition of the email by the user through the email creation interface.

10. The method of claim 9, wherein the displaying the email subject suggestion comprises:
    displaying the email subject suggestion within the email subject input interface at a first point in time;
    responsive to the user modifying the email with a text modification or an attachment modification at a second point in time later than the first point in time, updating the email subject suggestion based upon one or more new n-grams derived from a current state of the email at the second point in time to create a new email subject suggestion; and
    displaying the new email subject suggestion within the email subject input interface.

11. The method of claim 1, wherein the providing the email subject suggestion comprises:
    responsive to determining that the user initiated an email send command for the email while the email did not comprise a user specified email subject, providing the email subject suggestion to the user for selective use as the email subject before executing the email send command.

12. The method of claim 1, comprising:
disabling an email subject input interface for the email; and
providing an option to enable the email subject input interface.

13. The method of claim 1, wherein the generating an email subject suggestion comprises:
generating an abstract phrase based upon the n-gram as the email subject suggestion.

14. The method of claim 1, comprising:
identifying a second set of target n-grams having assigned probabilities exceeding the threshold;
generating a set of email subject suggestions based upon the second set of target n-grams; and
providing the set of email subject suggestions through the email creation interface.

15. The method of claim 14, comprising:
responsive to the user selecting a first email subject suggestion and not a second email subject suggestion, adjusting a first feature used to assign a first probability to a first n-gram used to create the first email subject suggestion.

16. The method of claim 15, comprising:
responsive to the user selecting the first email subject suggestion and not the second email subject suggestion, adjusting a second feature used to assign a second probability to a second n-gram used to create the second email subject suggestion.

17. The method of claim 1, wherein a feature comprises at least one of a number of words feature, a proper noun feature, a date feature, a specific action feature, an event feature, a complete phrase feature, a location feature, or an identified person feature.

18. A computing device comprising:
a non-transitory memory containing machine readable medium comprising machine executable code having stored thereon instructions for performing a method; and
a processor coupled to the non-transitory memory, the processor configured to execute the machine executable code to cause the processor to:
train a set of classifiers using a training set of email body text and email subjects to create a set of trained classifiers;
extract text within an email body of an email being composed by a user to generate a set of n-grams;
responsive to the email comprising an attachment, evaluate the attachment to the email to identify one or more n-grams to add into the set of n-grams;
identify features of n-grams within the set of n-grams;
utilize the set of trained classifiers to assign probabilities to the n-grams within the set of n-grams based upon the features, a probability specifying a strength of an n-gram in relation to a user preference of the user for an email subject derived from the n-gram;
identify a set of target n-grams from the set of n-grams based upon the set of target n-grams having assigned probabilities exceeding a threshold;
identify a single common theme amongst a plurality of target n-grams within the set of target n-grams, wherein the plurality of target n-grams comprises a first target n-gram associated with the single common theme and a second target n-gram associated with the single common theme;
responsive to identifying the single common theme, generate an email subject suggestion based upon the single common theme; and
provide the email subject suggestion for the email.

19. The computing device of claim 18, wherein the machine executable code causes the processor to:
train the set of classifiers using email body text and email subjects of historic emails associated with the user.

20. A non-transitory machine readable medium having stored thereon instructions for performing a method comprising machine executable code which when executed by at least one machine, causes the machine to:
extract content features from content to generate a set of n-grams;
identify features of n-grams within the set of n-grams;
utilize classifiers to assign probabilities to the n-grams within the set of n-grams based upon the features, a probability specifying a strength of an n-gram in relation to a user preference of a user for a content subject derived from the n-gram;
identify a set of target n-grams from the set of n-grams based upon the set of target n-grams having assigned probabilities exceeding a threshold;
identify a single common theme amongst a plurality of target n-grams within the set of target n-grams, wherein the plurality of target n-grams comprises a first target n-gram associated with the single common theme and a second target n-gram associated with the single common theme;
responsive to identifying the single common theme, generate a content subject suggestion based upon the single common theme; and
provide the content subject suggestion to the user.

* * * * *